US006193928B1

(12) United States Patent
Rauscher et al.

(10) Patent No.: US 6,193,928 B1
(45) Date of Patent: Feb. 27, 2001

(54) PROCESS FOR MANUFACTURING CERAMIC METAL COMPOSITE BODIES, THE CERAMIC METAL COMPOSITE BODIES AND THEIR USE

(75) Inventors: Steffen Rauscher, Ulm; Michael Scheydecker, Nersingen; Karl Weisskopf, Leinfelden-Echterdingen; Tanja Tschirge, Donzdorff; Rainer Zimmermann-Chopin, Rheinstetten, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/026,548

(22) Filed: Feb. 20, 1998

Related U.S. Application Data
(60) Provisional application No. 60/039,515, filed on Mar. 3, 1997.

(30) Foreign Application Priority Data

Feb. 20, 1997 (DE) .............................................. 197 06 925

(51) Int. Cl.$^7$ ...................................................... B22F 3/26
(52) U.S. Cl. ................................ 419/45; 419/10; 419/12; 419/13; 419/14; 419/19; 264/649
(58) Field of Search ................................ 419/45, 10, 12, 419/13, 14, 19; 264/649

(56) References Cited

U.S. PATENT DOCUMENTS

| | | | |
|---|---|---|---|
| 3,666,436 | 4/1972 | Bredzs et al. ........................ 75/0.5 R |
| 4,033,400 | 7/1977 | Gurwell et al. ......................... 164/98 |
| 4,585,618 | * 4/1986 | Fresnel et al. ......................... 419/12 |
| 4,650,552 | * 3/1987 | De Nora et al. ....................... 204/67 |
| 4,988,645 | 1/1991 | Holt et al. ............................... 501/91 |
| 5,145,619 | * 9/1992 | Abramovici ........................... 264/60 |
| 5,366,686 | * 11/1994 | Mortensen et al. ....................... 419/5 |
| 5,535,857 | 7/1996 | Barlow .......................... 188/218 XL |
| 5,708,956 | * 1/1998 | Dunmead et al. ..................... 419/12 |
| 5,928,979 | * 7/1999 | Inuzuka et al. ...................... 501/120 |

FOREIGN PATENT DOCUMENTS

| | | |
|---|---|---|
| 4447130 | 12/1994 | (DE) . |
| 197 06 926 | 8/1998 | (DE) . |
| 0 368 784 | 5/1990 | (EP) . |
| 0 368 785 | 5/1990 | (EP) . |
| WO 93/03192 | 2/1993 | (WO) . |
| WO 94/17219 | 8/1994 | (WO) . |

\* cited by examiner

Primary Examiner—Daniel J. Jenkins
(74) Attorney, Agent, or Firm—Evenson, McKeown, Edwards & Lenahan, P.L.L.C.

(57) ABSTRACT

A process for manufacturing ceramic metal composite bodies, the ceramic metal composite bodies and their use. The process is based on molten infiltration and the simultaneous or delayed exchange reaction of ceramic or metal ceramic un-fired bodies or sintered bodies which may consist of nitrides or carbides as well as metals, with molten metal of additional metals, whereby new nitride, carbide and intermetallic phases are formed which have improved wear and high-temperature characteristics. These ceramic metal composite bodies can be used for tribological applications.

14 Claims, No Drawings

PROCESS FOR MANUFACTURING CERAMIC METAL COMPOSITE BODIES, THE CERAMIC METAL COMPOSITE BODIES AND THEIR USE

This application claims the priority of German Patent Document DE 197 06 925 and U.S. Provisional Application, Serial No. 60/039,515 which were filed on Feb. 20, 1997 and Mar. 3, 1997, respectively.

BACKGROUND AND SUMMARY OF THE INVENTION

The invention relates to a process for manufacturing ceramic metal composite bodies, to the ceramic metal composite bodies and to their use.

In many technological fields, for example, for tribological applications, highly wear resistant ceramic metal composite bodies with good frictional properties are required. Applications may be at room temperature as well as the high-temperature range. Such ceramic metal composite bodies are manufactured by means of a process in the case of which a liquid-phase infiltration of ceramic pre-bodies by a molten metal and an exchange reaction coupled therewith take place. The metallic constituents can be charged as an external molten metal as well as an internal molten metal, which is obtained even before the molten infiltration/exchange reaction (SI/AR), by the metal phase being present in the ceramic phase in a distributed manner.

Processes for manufacturing metal ceramic composite bodies by means of the infiltration of porous ceramic bodies have been described in the literature. U.S. Pat. No. 5,535,857 claims the manufacturing of a metal ceramic brake disk by way of the infiltration of a porous SiC pre-body. For this ceramic body, the SiC powder is pressed into the required shape and presintered so that open pore channels remain. The porous disk is then infiltrated by means of an aluminum alloy, whereby a metal-reinforced ceramic matrix is created. During infiltration, the metal carries out no reaction with the matrix so that the temperature stability of the material depends on the reinforcing matrix. In the case of an aluminum infiltration, this means that the application limit of the material is 400° C.

Another process also describes the infiltration of a ceramic pre-body by means of aluminum (U.S. Pat. No. 4,988,645). In this case, the ceramic body is manufactured by way of an SHS reaction (SHS-reaction: Self-propagating high-temperature synthesis is the ignition of a reactive mixture), in which case the reaction maintains itself and supplies the desired ceramic matrix as a reaction product.

In U.S. Pat. No. 4,033,400, the infiltration of a porous ceramic body with a liquid metal is claimed, in which case the matrix consists of $Si_3N_4$ and the metal is composed of an Al-alloy. In this case also, it is clearly important that no reaction is to take place between the matrix and the metal.

The firm Lanxide Technology also claims a number of materials which were produced by way of metal infiltration (for example, European Patent Documents EP-B-0 368 785 and EP-B-0 368 784). These patents essentially claim new process steps, as, for example, the targeted oxidation of the ceramic pre-body.

So far, all patents have had in common that no reaction infiltration has taken place. One exception, in this case, was Patent U.S. Pat. No. 4,585,618 in which the infiltrated metal (aluminum) reacts with the matrix.

It is an object of this invention to produce a reinforced $TiB_2/Al_2O_3$ ceramic material for electrolysis cells. For this purpose, a $TiO_2/B_2O_3/Al$-mixture is infiltrated by aluminum. The infiltration time is 100 hours. The reaction product consists of $TiB_2/Al_2O_3/Al$, in which case, $Al_3Ti$ is also found on the surface which is not desirable.

The manufacturing of ceramic metal composite bodies presents the problem of requiring high process temperatures. This is connected with high costs because the furnaces and reaction vessels are exposed to high wear. If inert components are charged, high temperature and long reaction times must absolutely be avoided because, under these conditions, they are subjected to a serious corrosion by the molten metal. High melting temperatures occur, for example, when the metals titanium, zirconium, boron, vanadium and chromium are used. When low-melting alloys or metals are used, the maximal application temperature of the composite body will be at the low melting temperature of the alloy.

In addition, the use of external molten phases results in various process-related problems which are caused by the fact that no stationary reaction conditions exist. The penetration of the molten metal from the outside begins an exchange reaction. As a result, a reaction front pushes through the ceramic pre-body. Because of the exchange reaction, the front of the molten phase builds up reaction products and loses reactive metals. Component-shape-dependent and size-dependent concentration gradients therefore extend through the composite material. These concentration gradients can be reduced only by a very long aging at high temperatures. The gradients of the composition also lead to discontinuous physical and mechanical characteristics. In addition to the non-uniform distribution of the phases, the gradients may also result in different stoichiometric compounds with different physical or chemical characteristics.

Another problem is clogging of the pores by reaction products, which prevents a further penetration of the molten metal. Particularly in the case of large components, the edge areas are exposed to the molten metal significantly longer, whereby much reaction product is deposited there, whereas the internal areas come only briefly in contact with the molten metal. A precise checking of the porosity and of the pore size of the ceramic pre-body must therefore take place. A pore radius which decreases radially from the outside toward the inside would be ideal.

Finally, the infiltration may take place incompletely as a function of the type and composition of the porous ceramic pre-body, of the molten metal or of the implementation of the process so that an interfering residual porosity remains in the composite body. This problem occurs particularly when an internal molten metal is used because no additional material can be supplied to the porous pre-body made of the metal and the ceramic material.

Reference is made at this point to the applicant's patent application, German Patent Document DE 197 06 926 and U.S. Provisional Application Serial No. 60/040,496 with the title "for Manufacturing Ceramic Metal Compound Bodies and Use Thereof," which was filed with the same priority date as the present patent application.

It is therefore another object of this invention to develop a process for manufacturing ceramic metal composite bodies in which the above-mentioned disadvantages are avoided.

According to the invention, this object is achieved by a process for manufacturing ceramic metal composite bodies which has the following process steps:

producing a reaction mass from 40 to 95% by volume ceramics fraction and from 5 to 60% by volume of at least two-high-temperature melting metals as well optionally inert components, the composition of the metals being selected such that a low-melting eutectic phase of a reactive and less reactive metal is formed; heating the reaction mass under inert conditions to a temperature which permits the formation of a molten phase and maintaining the temperature until an exchange reaction has concluded.

In an embodiment of the invention the ceramics fraction of the reaction mass is used in bulk as a powder mixture or is used as a pressed part from a powder mixture; or as presintered porous mixed ceramics from a mixture of nitrides, carbides, silicides or borides of the elements silicon, titanium, vanadium, chromium, iron, aluminum, boron or magnesium.

According to the invention, it is provided that the ceramics fraction has an open porosity of from 5 to 70%.

It is within the scope of the invention that the metals in the reaction mass in the form of a metal alloy are used in bulk as metal powder; or are used as compressed-powder charges or as coarse pieces, which contain at least two of the elements silicon, tin, titanium, zirconium, aluminum, boron, indium, magnesium, calcium, vanadium, chromium, iron, cobalt, nickel, and copper.

Furthermore, it is preferred that the ceramics fraction of the reaction mass contains as inert components 20 to 80% by volume ceramic reinforcing components in the form of short fibers, fibrous tissue, fiber mesh, platelets or whiskers.

It is a further embodiment of the invention that the ceramic reinforcing components are present in the form of coated or uncoated carbon fibers or silicon carbide fibers.

It is advantageous for the production of the reaction mass to take place by means of a single-layer or multi-layer stacking of the components, a simple mixing of the components, by the pressing of a powder mixture of the compounds, or by means of a combination of these methods.

According to the invention, reaction mass is heated in a closed reaction vessel under argon, under vacuum or in air.

A slow heating rate of between 0.05 to 3° K/min is also preferred with pressed powder mixtures from the ceramic or metal phase.

It is also essential that, in the case of pressed or bulk powder mixtures from the ceramic or metal phase, an external pressure be applied during the heating, the molten metal infiltration and the exchange reaction.

A ceramic metal composite body manufactured by means of a process according to the invention is also within the scope of the invention.

Finally, the use of ceramic metal bodies in tribo-systems is also the scope of the invention.

It is an advantage of the invention that high process temperatures can be avoided.

According to the invention, no pure metals are used as the metal component but an alloy of two high-temperature melting metals, which have low-melting eutectic phases. The composition of the metal alloy is selected such that a low-melting eutectic phase comprising of a reactive and of a less reactive metal is present. As a result of the preferred reaction of the more reactive metal, the composition of the molten metal alloy changes during the exchange reaction in favor of the less reactive metal. Since, as a result, the composition of the remaining molten metal alloy moves away from the eutectic composition, after the exchange reaction, only a small fraction of the eutectic phase with a low melting point remains as the molten metallic phase. The metallic phase consists predominantly of the less reactive metal with a high melting point.

The problem of the concentration gradients and of the clogging of the pores by reaction products can also be solved by the process according to the invention. The problems connected with external molten infiltration can be avoided by the use of an internal metal phase. For this purpose, the metal phase is distributed in the ceramic pre-body even before the annealing operation. Preferably, an un-fired body made of a metal ceramic powder mixture is produced for this purpose. During the annealing, the molten metal phase is already homogeneously distributed in the ceramics. Thus, the molten infiltration/exchange reaction takes place simultaneously in the whole ceramic pre-body. Macroscopic concentration gradients are therefore not formed.

Another advantage of this approach is the exact control of the stoichiometry in the composite body; for, precisely the used metal quantity is reacted. In the case of the external molten infiltration, a more or less large molten reservoir must be made available for complete infiltration. The reaction of this reservoir can be controlled only poorly by way of the reaction duration and the immersion depth of the specimen. Another complication occurs if the molten phase can selectively dissolve certain components out of the composite material.

Finally, the problem of residuals interfering with porosity because of incomplete infiltration can also be solved by means of the approach according to the invention. In the case of the process with an internal molten phase, the metal fraction can be increased so far that a continuous and coherent molten phase is formed during the annealing. As a result, the whole body becomes soft, can collapse in itself or completely melt open and displaces the previously included porosity. In the case of this approach, the faithful dimensioning would be lost.

The specimen can be compressed by supplying an external pressure before or during the exchange reaction. This process is particularly advantageous for the process variant with an internal molten phase. The amount of the metal phase is selected such that it corresponds at least to the total porosity of the un-fired body. Since the metal phase is present here in a finely distributed manner, a brief contact pressure at or above the melting temperature is sufficient for compressing the metal phase. Low pressures may be used because the pre-body is easily deformable as the result of the molten phase. Since the quantity of molten metal phase corresponds at least to the initial porosity, nearly dense bodies are always produced in this manner. For cost aspects, it is important that the exchange reaction can then also be carried out without external pressure.

In the following, the invention will be explained by means of example.

DETAILED DESCRIPTION OF THE REFERRED EMBODIMENTS

EXAMPLE 1

Pure metal, internal metal phase; $Ti/Si_3N_4$

A molar ratio of $Ti/Si_3N_4$ of 10/1 is selected as the composition of the starting constituents. For producing the un-fired bodies, $Si_3N_4$-powder and Ti-powder are ground for several hours in an attrition-type grinder under alcohol (ethanol) without any additional additives. Drying of the powder takes place at 150° C. in a vacuum. For adjusting an agglomerate structure which is advantageous for the pressing, the powder is filtered through an 80 μm sieve. For the shaping, the powder is cold-isostatically pressed for 30 minutes at 4,000 bar in silicon matrices. As required, the un-fired bodies can then also be mechanically worked.

At a heating rate of 2° K/min., the un-fired bodies are heated to a temperature of 1,700° C. under flowing argon and are held there for 4 hours. By means of the exchange reaction, a composite body is obtained whose solid components consist of approximately 60% by volume of a continuous metallic phase of predominantly $Ti_5Si_3$ and of approximately 40% by volume of a discrete phase of TiN. The density of the composite body amounts to 3.51 g/cm$^3$. TiN exists as a prismatic precipitation in the order of from 10 to 50 μm in the metal phase.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for manufacturing ceramic metal composite bodies comprising:
    (a) producing a reaction mass of:
        40 to 95% by volume of a ceramics fractions; and
        5 to 60% by volume of an alloy comprising at least silicon and titanium;
        wherein the alloy forms a eutectic phase of a reactive metal and less reactive metal;
    (b) heating the reaction mass under inert conditions to a temperature which permits the formation of a molten phase; and
    (c) maintaining the temperature until an exchange reaction is concluded.

2. The process according to claim 1, wherein step (a) further includes inert components.

3. The process according to claim 1, wherein the ceramics fraction is selected from the group consisting of a powder mixture, a pressed part from a powder mixture, and a presintered porous mixed ceramic.

4. The process according to claim 3, wherein the ceramics fraction has a porosity of from 5 to 70%.

5. The process according to claim 1, wherein the ceramics fraction of the reaction mass contains 20 to 80% by volume ceramic reinforcing components as inert components comprising at least one of short fibers, fibrous tissue, fiber mat, platelets or whiskers.

6. The process according to claim 5, wherein the ceramic reinforcing components are coated or uncoated carbon fibers or silicon carbide fibers.

7. The process according to claim 1, wherein the producing comprises at least one of single-layer or multi-layer stacking of the components, simple mixing of the components, or by a pressing of a powder mixture of the components.

8. The process according to claim 1, wherein the heating is in a closed reaction vessel under argon, under vacuum, or in air.

9. The process according to claim 1, wherein the heating is at a heating rate of between 0.05 to 3 K/min and the ceramics fraction or the alloy comprise pressed powder mixtures.

10. The process according to claim 1, wherein the ceramics fraction or the alloy comprise pressed or powder mixtures and said process further comprises applying an external pressure during at least steps (b) and (c).

11. The process according to claim 3, wherein the ceramics fraction is a presintered porous mixed ceramic consisting essentially of a mixture of nitrides, carbides, silicides or borides of a element selected from the group consisting of silicon, titanium, vanadium, chromium, iron, aluminum, boron, and magnesium.

12. The process according to claim 1, wherein the metal alloy is a bulk metal powder, compressed-powder charges, or coarse pieces.

13. The process according to claim 1, wherein the metal alloy further comprises an element selected from the group consisting of tin, zirconium, aluminum, boron, indium, magnesium, calcium, vanadium, chromium, iron, cobalt, nickel, and copper.

14. The process according to claim 1, further comprising homogeneously distributing the metal alloy in the ceramics fraction.

* * * * *